United States Patent [19]

Watanabe

[11] 4,454,914
[45] Jun. 19, 1984

[54] METHOD FOR CONDITIONING GEOTHERMAL BRINE TO REDUCE SCALE FORMATION

[75] Inventor: David J. Watanabe, Orange, Calif.

[73] Assignee: Union Oil Company of California, Los Angeles, Calif.

[21] Appl. No.: 374,618

[22] Filed: May 3, 1982

[51] Int. Cl.$^3$ .................. E21B 41/02; E21B 43/34
[52] U.S. Cl. .................. 166/244 C; 166/266; 166/310; 252/8.55 E
[58] Field of Search .................. 166/244 C, 310, 279, 166/305 R, 266, 267, 369; 252/8.55 E, 8.55 B

[56] References Cited

U.S. PATENT DOCUMENTS

| | | | |
|---|---|---|---|
| 3,096,819 | 7/1963 | White, Jr. et al. | 166/310 X |
| 3,958,635 | 5/1976 | Zilch et al. | 166/244 C |
| 4,148,360 | 4/1979 | Watanabe | 166/300 |
| 4,203,492 | 5/1980 | Watanabe | 166/300 |
| 4,261,421 | 4/1981 | Watanabe | 166/281 |
| 4,267,887 | 5/1981 | Watanabe | 166/300 |
| 4,298,066 | 11/1981 | Colonna et al. | 166/300 |

OTHER PUBLICATIONS

"Field Evaluation of Scale Control Methods: Acidification", J. Z. Grens et al., Geothermal Resources Council, Transactions, vol. I, May 1977.
"A Survey of Treatment Methods for Goethermal Fluids", Sidney L. Phillips et al., SPE Paper 6606 Presented at the SPE-AIME International Symposium on Oilfield & Geothermal Chemistry, La Jolla, Calif., Jun. 27-28, 1977.

*Primary Examiner*—Stephen J. Novosad
*Attorney, Agent, or Firm*—Dean Sandford; Gregory F. Wirzbicki

[57] ABSTRACT

A method for conditioning a flow of hot geothermal brine or aqueous liquid to reduce scale formation by pH-sensitive, dissolved materials includes injecting into the flow of brine or liquid an anhydrous, halogenated acid precursor which hydrolyzes in the brine or liquid to form a hydrohalic acid. The acid precursor, which may be tetrachloromethane, is preferably injected into an extraction well at the vicinity of the producing formation at a rate reducing the pH of the brine or liquid about one pH unit, or to about 3.5, near the injection point. The method also provides for increasing, if necessary, the acid precursor hydrolysis rate in the brine or liquid by atomizing the injected acid precursor with a pressurized fluid, preferably gaseous nitrogen.

21 Claims, 1 Drawing Figure

METHOD FOR CONDITIONING GEOTHERMAL BRINE TO REDUCE SCALE FORMATION

BACKGROUND OF THE INVENTION

1. Field of the Invention

The present invention relates generally to the field of geothermal aqueous liquid production and more particularly to methods for preventing scale formation by such geothermal aqueous liquids.

2. Discussion of the Prior Art

Large subterranean reservoirs of naturally occurring steam and/or hot aqueous liquid can be found in many regions of the world. These natural reservoirs of geothermal steam and water or brine are particularly prevalent in regions where the thermal gradient near the earth's surface is abnormally high, being most often found in regions of volcanic, geyser and fumarole activity, for example, along the rim of the Pacific Ocean.

When readily accessible in advantageous locations, geothermal steam and water or brine have, for some time, been used for therapeutic purposes, industrial processes and/or direct heating. Although current interest is further developing geothermal resources for such purposes still exists, principal effort has recently been directed more towards developing these resources, which are usually considered to be at least partially renewable, for production of electric power, the use of which is usually far less site-restricted than is the more direct use of the geothermal fluids for non-electric power purposes. In particular, the recent steep increases in hydrocarbon fuel costs and actual or potential shortages of heretofore abundant supplies of hydrocarbon fuels, together with increasing bias against nuclear power, have substantially accelerated interest in developing geothermal fluids for electric power generation.

General techniques are, of course, known whereby hot geothermal fluids can be used to generate electric power. Geothermal steam can be used, usually after treatment to remove particulate matter and such gases as carbon dioxide and hydrogen sulfide, in substantially the same manner as boiler-generated steam to drive combination steam turbine/electric generator apparatus. Pressurized geothermal water or brine, having a temperature above about 400° F., can be flashed to a lower pressure to extract steam used for driving steam turbine/generators. Lower temperature geothermal water or brine can be used in a closed loop, binary system to vaporize a working fluid, the vapor being used to drive a gas turbine/generator.

Use of geothermal steam, being relatively direct and hence comparatively inexpensive, is usually preferred over use of geothermal water/brine for production of electric power, and in places such as The Geysers in California, a substantial amount of electric power is currently being generated at a competitive cost by geothermal steam. However, the scarcity of geothermal steam as compared to geothermal water/brine in commercially usable amounts has resulted in much of the geothermal power developmental efforts being concentrated on the use of geothermal water/brine.

In spite of the known, general techniques for using hot geothermal water or brine for production of electric power, in actual practice the problems encountered with handling and disposing of the large amounts of usually heavily contaminated and frequently highly saline geothermal liquids have often been quite formidable. Development of geothermal water/brine resources for production of commercial amounts of electricity has, in consequence, often been very difficult and costly to achieve.

The most serious problems encountered with use of hot geothermal aqueous liquids, especially with use of geothermal brine, for producing electric power (and often for other uses as well) usually result from severe equipment scaling caused by the liquid. Because of their typically high temperatures and their long natural residence times in subterranean formations, geothermal aqueous liquids ordinarily leach large amounts of minerals from the formations. These leached minerals typically include heavy metals such as lead, zinc, iron, silver, cadmium, and molybdenum. Such other minerals, as calcium and sodium, typically in the form of chlorides, are also typically dissolved into the geothermal liquid, as are naturally occurring gases, including carbon dioxide, hydrogen sulfide and methane. Large concentrations of silica, which may be in the form of silicic acid oligomers, are also commonly found dissolved in hot geothermal aqueous liquids.

During geothermal water/brine extraction, that is, while the fluid is leaving the producing formations and is still in the extraction wells, as well as during subsequent use of the fluid, pressure and temperature changes occur which cause saturation levels of many of the dissolved materials to be exceeded. As the saturation levels of these dissolved materials are exceeded, the materials leave the solution and, depending on the materials involved, may form insoluble, scale-forming precipitates. Other mechanisms, such as chemical reactions under altered water/brine conditions and polymerization, may also lead to formation of scale in system lines and equipment.

In typical geothermal power plants operated by steam obtained by flashing geothermal water/brine to a reduced pressure, several relatively distinct types of scaling problems may be encountered. For example, scaling within the producing formations, extraction wells and lines and equipment up to, and through, the wellhead separators used to separate non-condensable gases from the water/brine, is largely attributable to the formation of metal sulfides by reactions between dissolved metals and hydrogen sulfide. Downstream thereof, during, and subsequent to, flashing of the water/brine to remove steam, the predominant scaling is typically that caused by silica, due to normal polymerization processes and/or reactions with iron to form insoluble, iron-rich siliceous material. Calcite scaling, however, tends to predominate in the power plant extracted steam portion, including in the steam turbine. The scaling mechanisms responsible for the several scaling problems are different from one another, and the rate at which scale builds up on the inside of pipes and equipment may vary, not only according to scale type but according to composition, flow rate and temperature of the water/brine, from only fractions of an inch per month to several inches per month.

Because of the high cost and great difficulty of removing most scale deposits from pipe and equipment, considerable effort has understandably been expended in developing processes to prevent this often severe scaling. In general, these efforts have been directed either towards developing processes for controlled removal of the scale-forming materials, for example, for removal of silica by seeding techniques or by chemical addition before the scale can be formed, or towards developing processes for maintaining the scale-forming materials in solution during the entire geothermal water/brine transit through the power plant or other system. Processes for keeping the scale-forming materials in solution during the water/brine transit typically include pressure and/or temperature control of the water/brine and addition of chemicals which inhibit scale-forming mechanisms and/or reactions.

Particular disadvantages of induced precipitation of scale-forming materials, particularly of silica, are that large, complex, and usually quite expensive, precipitation equipment is necessary and that the cost of disposing of the large quantities of induced precipitates, which may amount to many tons per power plant operating day, is high. As a result, processes for preparing scale formation by maintaining the scale-forming materials in solution between geothermal water/brine extraction and reinjection or other disposal at least appear to be preferable over those processes which induce precipitation.

In developing processes for keeping scale-forming materials in solution, many types of scale formating mechanisms have been found to be quite pH-sensitive. Geothermal water/brine is usually fairly acidic in its natural state, typically having a room temperature or "effective" pH of between about 3.5 and about 4.5 or 5. (Unless otherwise stated, pH as used herein is the effective pH). Acidizing the geothermal water/brine somewhat more has been found to inhibit formation of the most common scales. Providing additional hydrogen ions during the acidizing is believed to enhance reactions which compete with precipitation reactions and/or to shift equilibrium precipitation reactions away from precipitation. Very importantly, each of the above-mentioned metal sulfide, calcite and silica scaling, certain of which predominate in different regions of typical geothermal water/brine power plants, are considered to be controllable by reducing the pH of the water/brine.

At its above mentioned typical pH, corrosion caused by geothermal water, or more specifically, by geothermal brine, to associated delivery and use piping and equipment has not usually been found to be a very serious problem, even when using piping and equipment made from common steels. As a result, the small pH reduction necessary to control scaling by the geothermal brine is not expected to significantly increase corrosion problems in the brine delivery and use system as a whole. However, in actual practice severe corrosion has sometimes been found to occur, at least in relatively localized regions at and near acid injection points. Such corrosion seems to result from concentrated acids being added so as to effect the desired brine pH reduction in as short a brine flow distance as practical when typically high brine flow rates are involved. As a result, considerably more expensive and much less readily available corrosion resistant piping and equipment may be required in such regions. In addition, expensive, highly corrosion resistant pumps and equipment are, of course, necessary for injecting the acid into the brine, which may, for example, be pressurized between about 100 psig to over 400 psig.

Further complications and expenses are involved with acidizing the brine in close proximity to the underground production zone so as to reduce sulfide scaling in the well. At the high production zone temperatures, typically between about 400° F. and 600° F., the corrosion rate is substantially increased and at these temperatures virtually any type of metal acid-delivery system will rapidly corrode. However, the severe flow turbulance associated with high brine production rates has precluded use of other than metal acid-delivery systems.

An object of the present invention is, therefore, to provide a method for acidizing hot geothermal water/brine so as to reduce or substantially prevent scaling thereby.

A further object of the invention is to provide a method for reducing the pH of hot geothermal water/brine, to reduce or substantially prevent scaling thereby, without causing substantial corrosion problems.

Another object of the invention is to provide a method for preventing or substantially reducing scaling by hot geothermal water/brine by acidizing the water/brine while it is still in the extraction well and is in close proximity to the production zone.

Additional objects, advantages and features of the invention will become apparent to those skilled in the art from the following description, when taken in conjunction with the accompanying drawing.

SUMMARY OF THE INVENTION

In accordance with the present invention, a method for acid conditioning a flow of hot geothermal aqueous liquid, such as geothermal brine, includes introducing into the geothermal liquid flow a thermally stable acid precursor of a type which hydrolyzes to form an acid, and dispersing the acid precursor in the geothermal liquid flow so as to hydrolyze the acid precursor and thereby reduce the pH of the geothermal liquid flow. The preferred acid precursor is a halogenated, non-acidic organic material having the general formula $C_wH_yX_z$, wherein w is an integer between 1 and about 5, y is equal to $[(2w+2)-z]$, z is an integer between 1 and $(2w+2)$ and X is a halogen selected from the group consisting of chlorine, fluorine, bromine, iodine and combinations thereof. More preferably, the acid precursor is tetrachloromethane, dichlorodifluoromethane or 1,1,1 trichloroethane, and is most preferably tetrachloromethane or 1,1,1 trichloroethane.

The acid conditioning method of the invention includes dispersing the acid precursor in the flow of geothermal aqueous liquid by atomizing the acid precursor with a pressurized fluid, preferably by an inert gas and more preferably by gaseous nitrogen. When the flow of geothermal aqueous liquid is from an extraction well having a geothermal liquid production zone, the acid precursor is preferably introduced into the geothermal liquid flow downhole and in proximity to the production zone.

Introduction of the acid precursor into the flow of geothermal aqueous liquid is at a rate which reduces the pH of the liquid flow, at least relatively adjacent to the point where the acid precursor is introduced, by between about 0.5 and about 2 pH units, and preferably by between about 0.5 and about 1 pH unit. Alternatively to lowering the pH of the geothermal liquid a predetermined fraction or number of pH units, the acid precursor may be introduced at a rate reducing the geothermal liquid pH to a pre-established level, preferably to between about 3.5 and about 4.5 and more preferably to between about 3.5 and about 4.

The method of the invention may also include the step of raising the pH of the geothermal aqueous liquid at a preselected region downstream of where the acid precursor is added, as may sometimes be necessary so that the acid conditioning method is compatable with other processes which may be used to treat the liquid. In such instances, a caustic, such as sodium hydroxide, may be added to the geothermal aqueous liquid at a rate restoring the liquid to substantially its original pH, or even making the pH higher than its initial value if the need arises.

BRIEF DESCRIPTION OF THE DRAWING

The present invention will be more readily understood by reference to the drawing which depicts in simplified form relevant portions of an exemplary geothermal brine power plant with which the pH modification method of the present invention may be used to advantage.

DETAILED DESCRIPTION OF THE INVENTION

The present acidizing (pH modification) method is effective for preventing or substantially reducing most scaling caused by hot geothermal water or brine. The acidizing method is thus effective for preventing scaling in geothermal power plants of both two-phase (flashed water or brine) and binary types, as well as in other systems which use geothermal water or brine for heating, cooling, or for other commercial, residential or industrial purposes. Accordingly, although the invention will be hereinafter described with respect to a particular embodiment in which the acidizing method is used to reduce the pH of a flow of geothermal brine in a flashed brine power plant, so as to prevent or substantially reduce scaling by the brine in the power plant, the invention is obviously not so limited.

Figure 1:
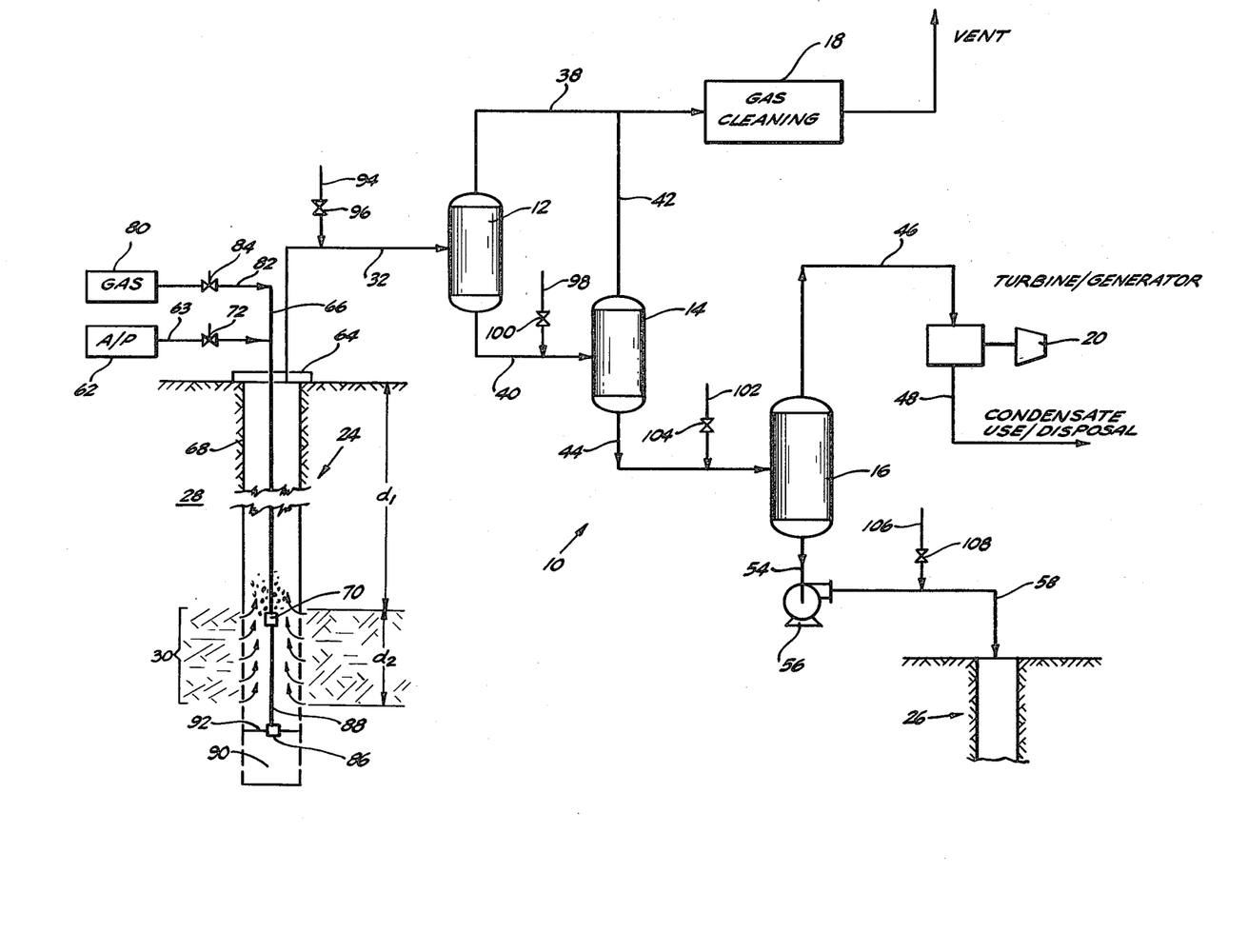

Shown in simplified form in the drawing are relevant portions of an exemplary geothermal brine power plant 10. Comprising generally power plant 10 are first wellhead separator 12, second wellhead separator 14, and flash vessel 16. Shown included in power plant 10 are gas cleaning means 18 and steam turbine/generator 20. Associated with power plant 10, but not actually forming a part thereof, are brine extraction well 24 and brine reinjection well 26. Extraction well 24 penetrates into earth 28 a depth "$d_1$" to brine producing formation 30 which has a thickness "$d_2$". Ordinarily, reinjection well 26 is similar to extraction well 24 and penetrates to the same producing formation 30.

In operation, hot geothermal brine is introduced under pressure from extraction well 24 through conduit 32 into the side region of first separator 12. Within separator 12, non-condensable gases including hydrogen sulfide, carbon dioxide and ammonia are stripped from the geothermal brine. These non-condensable gases are discharged from the top of separator 12 through gas conduit 38 into gas cleaning means 18. The brine is discharged from the bottom of separator 12 and is directed through conduit 40 into side regions of second separator 14 in which remaining amounts of non-condensable gases are stripped from the brine. These remaining gases are discharged from the top of separator 14 through gas conduit 42 into conduit 38, to be directed thereby into gas cleaning means 18. Included in gas cleaning means 18 may be heat exchangers (not shown) which enable heat to be extracted from the hot non-condensable gases to create additional steam from steam condensate in a manner known to those skilled in the art.

From second separator 14, the brine is discharged through conduit 44 into flashing vessel 16. Within flashing vessel 16, the brine is flashed to a substantially lower pressure so as to release steam, the released steam being routed from vessel 16 through conduit 46 to steam turbine/generator 20. Condensate and/or steam is discharged from turbine/generator 20 through conduit 48 for disposal or for routing the heat exchanger portions of gas cleaning means 18. Flashed brine is discharged from flashing vessel 16 through conduit 54 to pump 56 which pumps the brine through conduit 58 into reinjection well 26. Alternatively, pump 56 may pump the brine to other means of disposal or to other uses (not shown).

Effective pH of the brine as it enters well 24 from producing formation 30 is believed typically to be between about 4 and about 4.5; however, due to removal of the non-condensable gases, pH of the brine by the time it enters flashing vessel 16 typically increases to between about 5 and about 6. Ordinarily as the brine enters well 24 from formation 30, flashing occurs to an extent causing release of about 1 to 1.5 percent of the steam contained in the brine, and by the time the brine reaches the top of well 24, additional flashing usually has occurred to an extent that between about 10 and 20 percent of the steam has been released. Brine temperature at producing formation 30 varies considerably from well to well, but is usually in the broad range of from about 350° F. to about 600° F., with a brine temperature of between about 450° F. and about 500° F. being typical of many localities.

Metal, particularly heavy metal, sulfide scaling typically predominates in well 24, in conduit 32 between well 24 and first separator 12, in separator 12, in conduit 40 between separators 12 and 14 and in separator 14. Calcite scaling, on the other hand, usually predominates in steam conduit 46 from flashing vessel 16 and downstream thereof, whereas silica scaling usually predominates in brine conduit 54 from flashing vessel 16 and throughout the system downstream thereof. As previously mentioned, all three types of scaling start when saturation levels of the scale-forming materials are exceeded as a result of brine temperature decreases, particularly whenever flashing occurs along the brine flow path between production zone 30 in extraction well 24 and reinjection well 26.

The principal reactions involved with metal sulfide, calcite and silica scaling are, or are believed to be, as follows:

(1)

(2)

(3a)

and/or

Although as shown in reaction (1), M represents any metal having a plus 2 valence, sulfides of metals with valences other than plus 2 may, of course, also be involved. Reactions (3a) and (3b) represent the two most common silica scaling reactions which are believed to occur, reaction (3a) representing the "natural" polymerization of silica present in the form of silicic acid, and reaction (3b) representing formation of iron-rich siliceous material (silicate) by reaction of hydrated ferric oxyhydroxide with silicic acid (or silicic acid oligomers).

Further acidizing the already acidic geothermal brine is believed to shift equilibrium conditions away from the formation of precipates and/or to interfere with the precipitation reactions involved. The hydrogen ions (H+) added by the further acidization are believed, for example, to shift the equilibrium conditions in reactions (1) and (2) towards the left. Since the reaction rate of reaction (3a) depends on the presence of OH− ions in the brine, the added hydrogen ions, which reduces availability of the OH− ions, are believed to inhibit the silica polymerization mechanism, indications being that at a brine pH of about 6, for example, the silica polymerization rate is on the order of about 100 times faster than it is at a brine pH of about 4. In reaction (3b), the added hydrogen ions are believed to tie up the ferric oxyhydroxide and thereby inhibit the indicated reaction of ferric oxyhydroxide with silicic acid which forms insoluable iron rich silicates.

Inasmuch as reducing the brine pH has been found to inhibit all the above-described scale-forming reactions, and since metal sulfide scaling starts as soon as the brine enters well 24 from formation 30, acidification of the brine flow within well 24 in close proximity to formation 30 is, of course, much to be preferred over acidification of the brine farther downstream. However, heretofore no practical method for acidizing the high temperature brine near production formation 30 is believed to have been available. At typical downhole brine temperatures of between about 400° F. and about 600° F., injection of any acid sufficiently concentrated to cause the necessary brine pH reduction of from about 1 to 2 pH units, at typical brine flow rates of between about 400,000 and 800,000 pounds per hour, would cause rapid corrosion of even highly acid-resistant metallic delivery system. As has been pointed out, structural requirements associated with mounting the acid-delivery system several thousand feet into well 24 through a high velocity brine flow stream ordinarily preclude use of non-metallic acid-resistant materials such as glass or most plastics.

In accordance with the invention acidizing-caused corrosion is substantially eliminated by injecting into the brine near the formation 30 an anhydrous acid precursor which is inert in its unhydrolyzed state, but which rapidly hydrolyzes upon contact with the hot geothermal brine into a strong acid. The acid precursor is supplied from source 62 which is preferably located close to wellhead 64 of well 24. Acid precursor from source 62 is injected into well 24 through metal conduits 63 and 66. Conduit 66 extends downwardly into well 24, inside of well casing 68, to the region of producing formation 30. Nozzle 70, attached to the lower end of conduit 66, enables rapid dispersing of the injected acid precursor into the flow of geothermal brine from formation 30, thereby enhancing the rate at which the injected acid precursor hydrolyzes into an acid. Source 62 may include a metering pump (not shown) so that the acid precursor flow rate into well 24 can be regulated and/or monitored. Valve 72 may be additionally or alternatively installed in conduit 63 to enable controlling of the flow of acid precursor from source 62.

As more particularly discussed below, source 80 of pressurized gas, for example, gaseous nitrogen, may also be provided for atomizing the acid precursor prior to or during injection thereof into the brine. Conduit 82 from source 80 is shown connected so as to discharge into conduit 66, but may be alternatively routed along side of conduit 66 down well 24 to nozzle 70, in a manner not shown. Valve 84 is installed in conduit 82 for controlling the flow of pressurized gas from source 80.

In a preferred embodiment the downhole apparatus employed in the method of this invention includes anchor 86 attached to nozzle 70 by connecting rod or conduit 88. Anchor 86 helps maintain the position of nozzle 70 in well 24 during injection of the fluids down conduit 66. As the acid precursor alone or mixed with pressurized gas may be injected through nozzle 70 at a relatively high rate, and conduit 66 can be a small diameter coiled tubing extending several thousand feet down well 24 from wellhead 64, in the absence of anchor 86 nozzle 70 may behave somewhat like an inflated toy ballon which is released into the air without having the orifice tied off and turns and twists erratically as it flies about during deflation. Anchor 86 helps maintain nozzle 70 adjacent brine producing formation 30, the location where it is desired to inject the acid precursor into the flow of geothermal brine. Anchor 86 may be positioned anywhere in the vicinity of nozzle 70. Since brine producing formation 30 is sometimes incompetent, it is preferred to position anchor 86 in well 24 below producing formation 30 as shown in the drawing. Anchor 86 can be of any conventional design, for example, an anchor having three or more locking arms 92 which fold up independently as collars while anchor 86 is being lowered downhole. When the desired depth is reached, conduit 66 is retracted a short distance to set locking arms 92 against the formation. Later, when it is desired to remove nozzle 70 from well 24, a stronger upward pull on conduit 66 shears a pin (not shown) in anchor 86 allowing locking arms 92 to collapse and the apparatus to be pulled from well 24. Since the injected fluid or fluids exit conduit 66 via nozzle 70, connecting rod or conduit 88 does not transport any fluid. All that is required is that nozzle 70 be firmly attached to anchor 86. This connection is often made using a conduit simply because conduit material is readily available and easy to use, even though it is used for its mechanical strength rather than as a conduit.

Although various different acid precursors can be used to acidize the geothermal brine from formation 30, the precursor selected should rapidly hydrolyze upon injection into the brine flow from nozzle 70, and should, upon hydrolysis, form at least a moderately strong acid and preferably a hydrohalic acid. Using an acid precursor which rapidly hydrolyzes into a strong acid enables the desired brine pH reduction to be achieved within a relatively short distance downstream of nozzle 70, with a minimal injection rate of acid precursor being required for cost effectiveness.

Those acid precursors which have been found or are believed to be most suitable for use in the method of the invention are normally liquid, halogenated hydrocarbons, generally termed non-acidic organic materials, having the generalized formula:

$$C_w H_y X_z, \quad (4)$$

wherein w is an integer between 1 and about 5, y is equal to $(2w+2)-z$, z is an integer between 1 and $(2w+2)$ and X is a halogen selected from the group consisting of chlorine, fluorine, bromine, iodine and mixtures thereof, with the compound or compounds selected being thermally stable under the high temperature and pressure conditions to which it is exposed prior to its hydrolysis in the brine. As used herein, the term "thermally stable" is meant to distinguish over and exclude compounds which decompose prior to hydrolysis and/or polymerize under the temperature and pressure conditions encountered during brine acidizing. Halogenated hydrocarbons which thermally decompose under the conditions encountered prior to hydrolysis should be avoided since the resulting decomposition products, such as chlorine or fluorine, are highly toxic, and decomposition/pyrolysis products, for example, tars, tend to form difficult-to-remove deposits on the well casing, pipe and equipment.

The term "normally liquid" as used herein is meant to include those compounds which exist as liquids under the ambient temperature and pressure conditions encountered during injection of the acid precursor into the brine flow. In general, a compound which is "normally liquid" for the purposes of this invention has a normal melting point less than about 80° F. and preferably less than about 30° F., and has a normal boiling point above about 80° F. and preferably above about 170° F. Normally liquid compounds are more easily injected into the geothermal flow than are solids and are volumetrically more efficient to use than are gases. Accordingly, the term "normally liquid" ordinarily excludes compounds which exist as a solid or a gas under the expected temperatures and pressures to which the compounds are to be exposed before or during hydrolysis. However, even though use of "normally liquid", halogenated hydrocarbon acid precursor compounds is preferred, use of solid or gaseous acid precursors is not excluded from the present method and is within the scope of the invention.

Furthermore, the material used to acidify the flow of geothermal brine should consist essentially of an acid precursor or mixtures of more than one acid precursor and should not contain other materials which would adversely affect the hydrolysis rate of the acid precursor or which would form undesirable decomposition and/or pyrolytic products. The acid precursor should be anhydrous so that essentially no hydrolysis thereof occurs until its injection into the geothermal flow. Use of oxygen-containing compounds, including hydrocarbon compounds such as alcohols or ketones, should preferably be avoided, since at the high brine temperatures expected to be encountered these compounds tend to be corrosive even in an anhydrous state. Since unsaturated hydrocarbons having double or triple carbon bonds tend to polymerize and/or pyrolize at brine temperatures encountered in many locations, their use as acid precursors should also be avoided; thus, for example, halogenated olefins should not be used as the acid precursor. Of course, use as acid precursors of compounds which are flammable or explodable under the temperature and pressure conditions encountered in the brine acidification operation should obviously be avoided for safety considerations.

Polymerization and/or pyrolysis upon hydrolysis is expected to occur with use of halogenated saturated hydrocarbons having about 5 or more carbon atoms at moderately high brine temperatures, with use of halogenated saturated hydrocarbons having about 3 or more carbon atoms at high brine temperature, and with use of halogenated saturated hydrocarbons having about 2 or more carbon atoms at very high brine temperatures. Therefore, the halogenated, saturated hydrocarbon should be selected according to the geothermal brine temperature expected to be encountered. Accordingly, although halogenated hydrocarbon compounds having as many as 5 carbon atoms may be selected for acidizing moderate temperature brines, acid precursors having 3 or less carbon atoms are usually preferred for most brines. For use with high temperature geothermal brines, halogenated hydrocarbons having only a single carbon atom are the most preferred acid precursors.

Those halogenated saturated hydrocarbons having a single carbon atom per molecule believed to be particularly suitable for use as an acid precursor in the method of this invention include thermally stable, normally liquid hydrocarbon compounds having the general formulas $CX_4$ or $HCX_3$. Suitable compounds with the formula $CX_4$ include: tetrachloromethane (carbon tetrochloride), fluorotrichloromethane, bromotrichloromethane and dibromodichloromethane. Suitable compounds with the formula $HCX_3$ include: trichloromethane, tribromomethane, chlorodibromomethane, bromodichloromethane, iodidibromomethane, chlorodiiodomethane, iododichloromethane and fluorochlorobromomethane. As can be appreciated, however, the $CX_4$ compounds are usually preferred since each mole thereof hydrolyzes into 4 moles of acid. Of these $CX_4$ compounds, tetrachloromethane is the most preferred because of its good availability and relatively low cost.

Those halogenated hydrocarbons having two carbon atoms per molecule believed suitable for use as an acid precursor in the method of this invention include thermally stable, normally liquid compounds having the general formula $C_2X_6$, $HC_2X_5$, $H_2C_2X_4$ or $H_3C_2X_3$. Examples of suitable $C_2X_6$ compounds are: 1,1-difluorotetrachloroethane, 1,1,2-trifluorotrichloroethane and 1,1,2-trifluorotribromoethane. Suitable $HC_2X_5$ compounds include: pentachloroethane; fluorotetrachloroethane; fluorotetrabromoethane; difluorotribromoethane; 1,2-dichloro 1,1,2-tribromoethane; 1,1-dichloro 1,2-tribromoethane; dibromotrifluoroethane; dibromotrichloroethane and fluorodichlorodibromoethane. Suitable $H_2C_2X_4$ compounds include: tetrachloroethane (both the symmetrical and unsymmetrical isomers); tetrabromoethane (both the symmetrical and unsymmetrical isomers); fluorotrichloroethane; 1-fluoro 1,1,2-tribromoethane; 1-fluoro 1,2,2-tribromoethane; difluorodichloroethane; 1,2-difluoro 1,2-dibromoethane; 1,1-difluoro 2,2-dibromoethane; chlorotribromoethane; 1,1-dichloro 1,2-dibromoethane; 1,2-dichloro 1,2-dibromoethane; 1,1-dichloro 2,2-dibromoethane and bromotrichloroethane. Examples of $H_3C_2X_3$ compounds which can be used are: 1,1,1 trichloroethane; 1,1,1 trifluoroethane or 1,1,1 dichlorofluoroethane, with 1,1,1 trichloroethane being usually preferred because of its low cost and good availability.

Halogenated hydrocarbon compounds having 3 to 5 carbon atoms obviously offer a very much greater variation of halogen substitutions, and useable acid precursors in this category include such compounds as octachloropropane and heptachloropropane.

Mixtures of acid precursors can also be used, either in the form of a solution or an admixture thereof. Moreover, use of a sequence of discrete "slugs" of different acid precursors is also within the scope of the present method, but is less preferred because of the additional injection system equipment required.

Selection of an acid precursor for use in the present brine acidizing method also depends, at least to some extent, upon the characteristics of the particular geothermal brine being acidified, for example, the amount and type of scale-forming materials contained in the brine and the pH of the brine. In addition to the expected temperature and pressure conditions to which the acid precursor will be exposed prior to and during hydrolysis, the cost, availability and handling characteristics of the acid precursor are also important considerations affecting selection thereof.

Based on all or most of such considerations, halogenated hydrocarbons having only one carbon atom are, as above discussed, usually preferred over those having 2 or more carbon atoms, especially for injection temperatures above about 500° F. Among halogenated hydrocarbons having only a single carbon atom, acid precursors of the formula $CX_4$ are, as noted, preferred because of the amount of acid formed, tetrachloromethane being particularly preferred because of its ability to hydrolyze readily over a wide temperature range of about 250° F. to about 700° F., as well as its mentioned low cost and good availability. However, for halogenated hydrocarbons having 2 carbon atoms, 1,1,1 trichloroethane is preferred because of its ability to hydrolyze readily (into hydrochloric and acidic acids) even at low brine temperatures, and for its low cost and its good availability.

According to the present acidizing method, the acid precursor is introduced from source 62, down well 24, through conduit 66 and nozzle 70, into the geothermal brine flow proximate to producing formation 30. During passage through conduit 66 and nozzle 70, the acid precursor is kept in a substantially anhydrous state to prevent premature hydrolysis and the resulting acid corrosion of the injection system. By "substantially anhydrous" it is meant that the acid precursor does not contain more than a minor amount of water, the amount of water that can be tolerated depending principally upon the temperature to which the acid precursor is heated during its passage from source 62 through the injection system. At relatively low brine temperatures, for example, from about 250° F. to about 300° F., water concentrations as high as about 10 weight percent may be tolerable since the acid precursor and water are generally immiscible during transit and therefore the precursor does not hydrolyze readily; however, at higher temperatures, for example, between about 500° F. and 700° F., water concentrations in the acid precursor must usually be less than about 1 weight percent due to the accelerated hydrolysis rate at these higher temperatures. Thus, for the purposes of this invention, an acid precursor is "substantially anhydrous" when it contains less than the amount of water which during passage of the acid precursor from source 62 to the brine injection point would cause a significant amount of hydrolysis of the acid precursor resulting in an unacceptable rate of corrosion in the acid precursor injection equipment. Best results are, or course, usually obtained when the acid precursor is introduced into the geothermal brine from source 62 as a completely anhydrous liquid so that possibility of hydrolysis and acid corrosion of the injection system is substantially avoided.

Injection rate of the acid precursor from source 62 into the geothermal brine flow depends upon the amount of brine pH reduction sought to be achieved, as well as upon the type of acid precursor used and the brine characteristics, including pH, temperature, pressure and composition. In order to substantially prevent metal sulfide scaling in well 24, a brine pH reduction preferably between about 0.5 and about 2 pH units, and more preferably between about 0.5 and about 1 pH unit, is typically provided. Thus, if the brine has an effective pH of between about 4.5 and 5 in the well, a brine pH reduction to between about 3.5 and about 4 is preferred to prevent metal sulfide scaling. An acidized brine pH as low as about 3.5 within the brine utilization system is believed possible without causing substantial corrosion of readily available and reasonably priced steel pipe and equipment. Because of the wide variation of brine compositions encountered, and due to the somewhat unpredictable buffering action of such brine constituents as silicic acid, ferrous ions, ammonia and carbon dioxide, the required injection rates of acid precursor are difficult to predict; however, in actual practice the injection rates can usually be determined without much difficulty by monitoring brine pH at the vicinity of wellhead 64. Scaling and corrosion rates may also be monitored in piping sections located near wellhead 64.

The acid precursor hydrolysis rate depends not only upon brine temperature but on surface contact area between the injected acid precursor and the brine. If the acid precursor is injected into the brine flow through even a small diameter aperture, the resulting stream of acid precursor tends to provide a comparatively low surface contact area of the precursor with the brine. Consequently, hydrolysis of the acid precursor may be slower than desired, particularly at low or moderate brine temperatures. Under such circumstances, the brine may not be acidized as close to the injection point as necessary, and some scale formation may occur just downstream of the precursor injection point. Also, when injecting into well 24, if the brine upward flow velocity is not sufficiently high to carry the acid precursor along, some acid precursor may fall to well bottom or "rat-hole" 90 before it is hydrolyzed. When the acid precursor in the rat-hole hydrolyzes, pH of the liquid in this region can become quite low and severe corrosion of the well liner in this region may occur.

Rate of hydrolysis of the acid precursor in the brine is increased over that obtained with single-jet injection by injecting the precursor into the brine flow through nozzle 70, which is similar to a shower head in that it has a number of openings (not shown) for breaking up the main stream of acid precursor into a number of small streams so as to substantially increase the precursor-brine surface contact area. However, under such adverse conditions as low brine temperature, low brine upflow rate, and/or high acid precursor injection rates, an even greater acid precursor hydrolysis rate may be needed than is provided by nozzle 70. Under these or other adverse conditions, the acid precursor may be advantageously injected by or with a pressurized fluid, preferably an inert gas such as air, carbon dioxide, helium or nitrogen, with gaseous nitrogen being preferred, from source 80. The fluid from source 80 mixes with the acid precursor as the two fluids pass downwardly through conduit 66. The fluid from source 80 is sufficiently pressurized to atomize the acid precursor as the precursor is injected into the brine from nozzle 70, thereby providing a precursor-brine surface contact area many times, for example, from 10 to over 100 times, greater than obtained by use of nozzle 70 alone. As a result of the high contact area provided by such pressurized fluid injection, extremely rapid and complete hydrolysis of the acid precursor is achieved within a very short downstream distance of nozzle 70. Although an inert gas, such as nitrogen, is preferred as an injection fluid, even pressurized water may be used if the water is separately conducted to nozzle 70 through its own conduit (not shown) and is combined with the acid precursor only at the injection point so as not to cause premature hydrolysis of the precursor. It should be appreciated that injection of the acid precursor with a pressurized fluid can be used even under those conditions which result in satisfactory hydrolysis of the acid precursor without atomization; however, to do so would ordinarily be undesirable, since the cost of brine pH modification would be unnecessarily increased by cost of the injecting fluid and its related injection equipment.

As above described, the acid precursor is injected from source 62 downhole at producing formation 30 so as to acidize the pH of the brine as closely as practical to its origin.

Reduction of brine pH to between about 3.5 and about 4 or about 4.5 downhole is, as stated, expected not only to prevent metal sulfide scaling through separator 14, but also to prevent silica scaling downstream thereof and even to provide sufficient acid carry-over to prevent or at least help prevent, calcite scaling in steam conduit 46 and in the steam system downstream thereof. However, since brine pH usually changes along the brine flow path through power plant 10, for example, as non-condensable gases are removed at separators 12 and 14 and the brine is flashed in vessel 16, it may be desirable, or may even be found to be necessary in some systems or for some applications, to inject the acid precursor into the brine flow in places where significant pH changes occur. By so doing, a more uniform brine pH modification may be achieved or the amount of brine acidizing may be varied according to the amount required at various locations.

To this end, the acid precursor may, for example, in addition to being injected downhole, be injected into brine conduit 32 between wellhead 64 and first separator 12 via conduit 94 containing valve 96; into brine conduit 40 between first and second separators 12 and 14 via conduit 98 containing valve 100; into brine conduit 44 between second separator 14 and flash vessel 16 via conduit 102 containing valve 104; and/or into conduit 58 just upstream of injection well 26 via conduit 106 containing valve 108. Conduits 94, 98, 102 and 106 each are connected to acid precursor 62 and pressurized gas source 80 (connections not shown). Alternatively, although with less expected scale reducing benefits, the acid precursor may be injected via conduits 94, 98, 102 and/or 106 without addition of acid precursor into the vicinity of producing formation 30.

Advantages of using an acid precursor over an acid for brine acidizing via conduits 94, 98, 102 and/or 106 are, among others, that special and costly acid resistant injection equipment is not required and acid-caused corrosion in conduits 32, 40, 44 and/or 58 adjacent the injection points should be substantially prevented, thereby eliminating the need for special and costly acid resistant sections of brine flow conduit.

The scope of the present invention also includes the adding of a basic compound into the brine flow to deacidize the brine, as may, for example, be needed in some systems to make the present brine acidizing process compatable with other brine treatment processes. In some instances in which brine de-acidizing is needed, sufficient basic material, for example, a solution of caustic is injected into the brine in an amount and at a rate returning the brine pH to about its original, pre-acidizing level. In other instances, sufficient basic material may be injected to raise the brine to a selected level which may be below or which may be above its pe-acidizing level.

The present invention is further described by the following example which is illustrative of various aspects of the invention but which is not intended as limiting the scope of the invention as defined by the appended claims.

EXAMPLES 1 AND 2

A slipstream of geothermal brine is diverted from a 10 inch geothermal brine conduit which extends between first and second wellhead separators corresponding to separators 12 and 14 of the drawing, the 10 inch brine conduit therefore corresponding to conduit 40. The brine slipstream is diverted from the main brine flow through a 2 inch diameter conduit which discharges through a manifold into first and second straight, parallel 2 inch conduits, each such conduit being about 12 feet long. The first and second 12 foot conduits discharge into associated "scaling spools", each of the spools being about 2 feet long, 2 inches in diameter and filled with about ½ inch diameter ceramic balls which provide a relatively large surface area upon which scale deposits. From these spools the brine is returned to the 10 inch brine conduit.

The first 12 foot conduit and its associated scaling spool is used for control purposes, whereas an acid precursor, specifically tetrachloromethane, is injected through an 0.014 inch diameter opening into the upstream end of the second 12 foot conduit. Geothermal brine is flowed through each of the 12 foot conduits at a rate of about 2.8 gallons per minute to provide a brine residence time of about 40 seconds in each conduit. Brine pressure is reduced in each scaling spool, by flashing the brine, from an incoming pressure of about 450 psig down to a pressure of about 250 psig. Brine is flowed through each of the 12 foot conduit and scaling spools at the approximately 2.8 gallons per minute flow rate for a test period approximately 8 hours long.

the acid precursor is initially injected for a short time into the second 12 foot conduit at a metered rate of about 2½ cubic centimeters per minute; however brine discoloration indicates the presence of corrosion products. The acid precursor injection rate is then reduced to, and maintained at, approximately 1 cubic centimeter per minute for the remainder of the 8 hour test period. This 1 cubic centimeter per minute acid precursor injection rate provides an acid concentration of about 150 ppm in the brine after hydrolysis into hydrochloric acid, and causes a brine pH reduction of approximately 1 pH unit in the test conduit. No noticeable formation of corrosion products occurs at this acid precursor injection rate. At the end of the 8 hour test period, scale formed on the ceramic balls in each of the scaling spools is removed by conventional ball mill grinding. The removed scale from each spool is separately weighed.

The above described test is performed twice, using geothermal brine from two different extraction wells, identified in the following table as well numbers 1 and 2, the brines from these wells having the tabulated characteristics. The corresponding weights of scale formed in each of the spools associated with the 12 foot conduits are also tabulated.

| Description | Well No. 1 | Well No. 2 |
|---|---|---|
| Brine Production Rate (Lbs/Hr.) | 290,000–485,000 | 280,000–450,000 |
| Brine Composition: | | |
| silica (ppm) | 167–209 | 230–267 |
| calcium (ppm) | 13,000–13,800 | 24,100–24,700 |
| sodium (ppm) | 31,200–33,500 | 54,500–55,000 |
| barium (ppm) | 700–750 | 1,110–1,270 |
| iron (ppm) | 1,980–2,100 | 4,120–4,400 |
| lead (ppm) | 106 | 238–264 |
| zinc (ppm) | 268–489 | — |
| strontium (ppm) | 825–884 | 1,173–1,250 |
| boron ppm | 112–120 | approx. 249 |
| chlorine (ppm) | 79,900–83,500 | 142,000–155,000 |
| potassium | 7,530–7,900 | 13,600–13,950 |
| Total Dissolved Solids (ppm) | 147,000–148,000 | 158,000–263,000 |
| Noncondensable: | | |
| hydrogen sulfide (Wt. ppm) | 86–98 | 41–86 |
| carbon dioxide (Wt. ppm) | 75,000 | 33,600–35,900 |
| ammonia (Wt. ppm) | 522–561 | 52–78 |
| Brine Temp. in slipstream (°F.) | 450 | 450 |
| Brine Pres. in slipstream (psig) | 450 | 450 |
| Brine effective pH in slipstream | 5–5.5 | 5–5.5 |
| pH decrease due to acid precursor addition (pH units) | Approx. 1 | Approx. 1 |
| Wt. of scale in control spool (gms) | 9–10 | 30–40 |
| Wt. of scale in test spool (gms) | 2.5 | 7–10 |
| Scale reduction by brine acidizing (%) | 75 | 75 |

By reducing the brine pH in the second 12 foot test conduit by approximately 1 unit, by acid precursor injection, the amount of scale formed in the associated scaling spool is reduced in both tests by about 75 percent over the amount of scale formed in the control scaling spool.

EXAMPLE 3

A geothermal well when first placed on production produces 350,000 pounds/hour brine having a pH of 5.0 to 5.5, a temperature of 450° F. and a pressure of 450 psig at the surface of the well. The brine contains 200 ppm silica, 15,000 ppm calcium, 35,000 ppm sodium, 90,000 ppm chlorine and 155,000 ppm total dissolved solids. The produced brine is passed through a power plant consisting of sequentially positioned first separator vessel, second separator vessel, flashing vessel and turbine. The non-condensable gases are stripped from the brine in the first and second separator vessels. The brine is flashed in the flashing vessel. The steam produced is passed to a turbine for power generation. The condensate from the turbine and the brine from the flashing vessel are injected back into a subterranean reservoir via an offset injection well.

After operating in the above-described manner for about 100 days, the brine production rate drops to about 280,000 pounds/hour and the injection well becomes essentially plugged as indicated by excessive pressure build up. Both the production and injection wells are shut in. An inspection of the system shows the presence of an iron sulfide scale in the producing well and the first and second separators, an iron-rich siliceous scale in the flashing vessel and injection well, and a calcite scale in the steam turbine. The scale is mechanically removed from the entire system.

Next, there is lowered into the production well a treating fluid delivery and anchoring assembly consisting of a nozzle having 24 openings of 1/16 inch diameter in the sidewall thereof, a tubing anchor having three folding arms capable of extending and temporarily locking the anchor against the sidewall of the borehole, the anchor being positioned below the nozzle and attached to the bottom end of the nozzle by a length of continuous steel tubing, another length of 1 inch inside diameter continuous steel tubing attached to the top of the nozzle and extending to the surface of the well. The nozzle is positioned opposite the geothermal brine producing strata and the anchor is positioned in the wellbore below the producing strata. The continuous steel tubing is then given an upward pull at the surface to lock the anchor in place. At the surface, a source of nitrogen and a source of tetrachloromethane acid precursor are attached to the continuous steel tubing.

The geothermal well is again placed in production at the rate of 350,000 pounds/hour brine having the same temperature and pressure as during the initial production phase. 3 to 5 gallons/hour of tetrachloromethane acid precursor atomized by 10 to 15 SCF/hour nitrogen are continuously injected down the continuous steel tubing and out the nozzle to mingle with the geothermal brine at the producing strata. The produced geothermal brine whose pH is now adjusted to 4.5 to 5.0 is passed through the surface facility as described above. After 120 days the brine production rate is still 350,000 pounds/hour, the injection well shows no pressure build up, and the turbine is generating a steady power. This indicates that the scale buildup in the system is negligible.

Although a particular embodiment of the invention has been described, it will, of course, be understood that the invention is not limited thereto, since many obvious modifications can be made, and it is intended to include within this invention any such modifications as may fall within the scope of the claims.

I claim:

1. A method for acidizing a hot aqueous geothermal liquid flowing through a conduit to reduce scale formation in said conduit, said acidizing method comprising introducing into said geothermal liquid a thermally stable acid precursor of a type which hydrolyzes in said geothermal liquid to form an acid which reduces the pH of said geothermal liquid at least in the relative downstream vicinity of where said acid precursor is introduced into said geothermal liquid.

2. The acidizing method defined in claim 1 wherein said acid precursor comprises a halogenated, non-acidic organic material having the general formula:

$$C_w H_y X_z,$$

wherein w is an integer between 1 and about 5, wherein y is an integer equal to [(2w+2)−z], wherein z is an integer between 1 and (2w+2) and wherein X is a halogen selected from the group consisting of chlorine, fluorine, bromine, iodine or combinations thereof.

3. The acidizing method defined in claim 2 wherein said acid precursor is selected from the group consisting of tetrachloromethane, dichlorodifluoromethane and 1,1,1 trichloroethane.

4. The acidizing method defined in claim 3 wherein said acid precursor is tetrachloromethane.

5. The acidizing method defined in claim 3 wherein said acid precursor is 1,1,1 trichloroethane.

6. The acidizing method defined in claim 1 wherein said acid precursor is dispersed into said flow of geothermal liquid by using a pressurized fluid to atomize said acid precursor prior to injection of said acid precursor into said geothermal liquid.

7. The acidizing method defined in claim 6 wherein said pressurized fluid is a gas selected from the group consisting of nitrogen, air, carbon dioxide and helium.

8. The acidizing method defined in claim 6 wherein said pressurized fluid is nitrogen.

9. The acidizing method defined in claim 1 wherein said acid precursor is introduced into said geothermal liquid in an amount so as to lower the pH of said geothermal liquid, at least relatively downstream adjacent to the area of said injection, by between about 0.5 and 2 pH units.

10. The acidizing method defined in claim 9 wherein said pH of said geothermal liquid is lowered by between about 0.5 and about 1 pH unit.

11. The acidizing method defined in claim 1 wherein said geothermal liquid is flowing through a geothermal extraction well having a geothermal liquid production zone and wherein said acid precursor is introduced into said geothermal liquid in said well in proximity to said production zone.

12. A method for acidizing a hot aqueous geothermal liquid so as to inhibit scale formation by pH sensitive scaling materials, said geothermal liquid flowing through an extraction well having a geothermal liquid production zone, said method comprising the step of introducing through a fluid flow means communicating from the exterior of said extraction well into said well and downhole to the vicinity of said production zone and into said geothermal liquid a thermally stable anhydrous, liquid, halogenated non-acidic organic material having the general formula:

$$C_wH_yX_z,$$

wherein w is an integer between 1 and about 5, wherein y is an integer equal to [(2w+2)−z], wherein z is an integer between 1 and (2w+2) and wherein X is a halogen selected from the group consisting of chlorine, fluorine, iodine and bromine or combinations thereof, and which hydrolyzes upon contact with said geothermal liquid into a hydrohalic acid.

13. A method for acidizing a hot aqueous geothermal liquid so as to inhibit scale formation by pH sensitive scaling materials, said geothermal liquid flowing from an extraction well having a geothermal liquid production zone through a power plant via a series of conduits, said method comprising introducing into one or more of said conduits in said power plant and into said geothermal liquid a thermally stable anhydrous, liquid, halogenated non-acidic organic material having the general formula:

$$C_wH_yX_z,$$

wherein w is an integer between 1 and about 5, wherein y is an integer equal to [(2w+2)−z], wherein z is an integer between 1 and (2w+2) and wherein X is a halogen selected from the group consisting of chlorine, fluorine, iodine and bromine or combinations thereof, and which hydrolyzes upon contact with said geothermal liquid into a hydrohalic acid.

14. The acidizing method defined in claim 12 or 13 including the step of combining said organic material with a pressurized fluid so as to atomize said organic material within said geothermal liquid and enhance the rate of hydrolysis of said organic material.

15. The acidizing method defined in claim 12 or 13 wherein said pressurized fluid is gaseous nitrogen.

16. The acidizing method defined in claim 12 or 13 wherein said organic material is introduced into said geothermal liquid at a rate lowering the pH thereof to between about 3.5 and about 4.

17. The acidizing method defined in claim 12 or 13 wherein said organic material is selected from the group consisting of tetrachloromethane, 1,1,1 trichloroethane and dichlorodifluoromethane.

18. A method for acidizing a hot, pressurized aqueous geothermal liquid containing materials which form scales when the pH of said geothermal liquid exceeds a predetermined value as a result of flashing of said geothermal liquid, said geothermal liquid flowing from a geothermal liquid production zone defined in an extraction well, said method comprising the steps of:

(a) injecting into said geothermal liquid at a point within said extraction well and relatively adjacent to said production zone a thermally stable, anhydrous, halogenated non-acidic organic material which hydrolyzes into a hydrohalic acid under conditions within said well, said organic material having the general formula:

$$C_wH_yX_z,$$

wherein w is an integer between 1 and about 5, wherein y is an integer equal to [(2w+2)−z], wherein z is an integer between 1 and (2w+2) and wherein X is a halogen selected from the group consisting of chlorine, fluorine, bromine, iodine or combinations thereof; said organic material being injected at a rate causing the pH of said geothermal liquid to be no greater than said predetermined pH value; and (b) combining said organic material with a pressurized gas so as to cause atomization of said organic material prior to injection thereof into said geothermal liquid to thereby enable an enhanced rate of hydrolization of said organic material into said hydrohalic acid.

19. The acidizing method defined in claim 18 wherein said organic material is selected from the group consisting of tetrachloromethane and 1,1,1 trichloroethane and wherein said pressurized gas is nitrogen.

20. The acidizing method defined in claim 18 wherein said predetermined pH is between about 3.5 and about 4.5.

21. The acidizing method defined in claim 20 wherein said predetermined pH is about 3.5.

* * * * *